United States Patent
Falsetti et al.

(10) Patent No.: US 8,231,279 B2
(45) Date of Patent: Jul. 31, 2012

(54) UNIT FOR SUPPORTING AXLE-SHAFT OF GO-KARTS

(75) Inventors: Fabio Falsetti, Turin (IT); Paolo Andolfi, Turin (IT)

(73) Assignee: Aktiebolaget SKF, Göteborg (SE)

(*) Notice: Subject to any disclaimer, the term of this patent is extended or adjusted under 35 U.S.C. 154(b) by 411 days.

(21) Appl. No.: 12/311,307

(22) PCT Filed: Sep. 17, 2007

(86) PCT No.: PCT/EP2007/008060
§ 371 (c)(1),
(2), (4) Date: Mar. 25, 2009

(87) PCT Pub. No.: WO2008/037368
PCT Pub. Date: Apr. 3, 2008

(65) Prior Publication Data
US 2010/0025952 A1 Feb. 4, 2010

(30) Foreign Application Priority Data
Sep. 26, 2006 (IT) .............................. TO2006A0682

(51) Int. Cl.
*F16C 23/08* (2006.01)
(52) U.S. Cl. ...................................................... 384/498
(58) Field of Classification Search ................. 384/495, 384/496, 497, 498, 537; 403/289, 290
See application file for complete search history.

(56) References Cited

U.S. PATENT DOCUMENTS

| | | | | |
|---|---|---|---|---|
| 2,290,213 A | * | 7/1942 | Shafer | 384/498 |
| 2,676,853 A | * | 4/1954 | Shafer | 384/495 |
| 2,779,641 A | * | 1/1957 | Sutowski | 384/502 |
| 3,339,991 A | * | 9/1967 | Howe, Jr | 384/498 |
| 4,611,933 A | * | 9/1986 | Hofmann et al. | 384/537 |
| 5,066,147 A | * | 11/1991 | Brandenstein et al. | 384/537 |
| 5,176,457 A | * | 1/1993 | Hofmann et al. | 384/537 |
| 5,178,035 A | * | 1/1993 | D'Aluisio | 384/537 |
| 5,310,268 A | * | 5/1994 | Schlereth | 384/537 |
| 6,860,639 B2 | * | 3/2005 | Tabuchi et al. | 384/537 |

FOREIGN PATENT DOCUMENTS

| | | |
|---|---|---|
| EP | 1347189 A | 9/2003 |
| GB | 1030087 A | 5/1966 |
| WO | WO2004076203 A | 9/2004 |

\* cited by examiner

*Primary Examiner* — Michael P Ferguson
(74) *Attorney, Agent, or Firm* — Mark A. Ussai; Bryan Peckjian

(57) ABSTRACT

A unit (1) for supporting the axle-shafts of go-karts provided with an annular body (12) having a variable perimeter and with a rolling bearing (20), set within the annular body (12) itself with the possibility of oscillation about an axis of adjustment (B) transverse to an axis (B) of rotation of the bearing (20) itself; a tightening system (30) being provided for tightening the support (11) on the bearing (20) and for blocking the bearing (20) itself in an operative position, and being defined by at least two sharp edges (32) (33) (36), fixed with respect to the bearing (20) and set about the axis (B) of rotation for cutting into a softer material of the concave seat (13), preventing any rotation of the bearing (20) about the axis (A) of adjustment in said operative position.

8 Claims, 2 Drawing Sheets

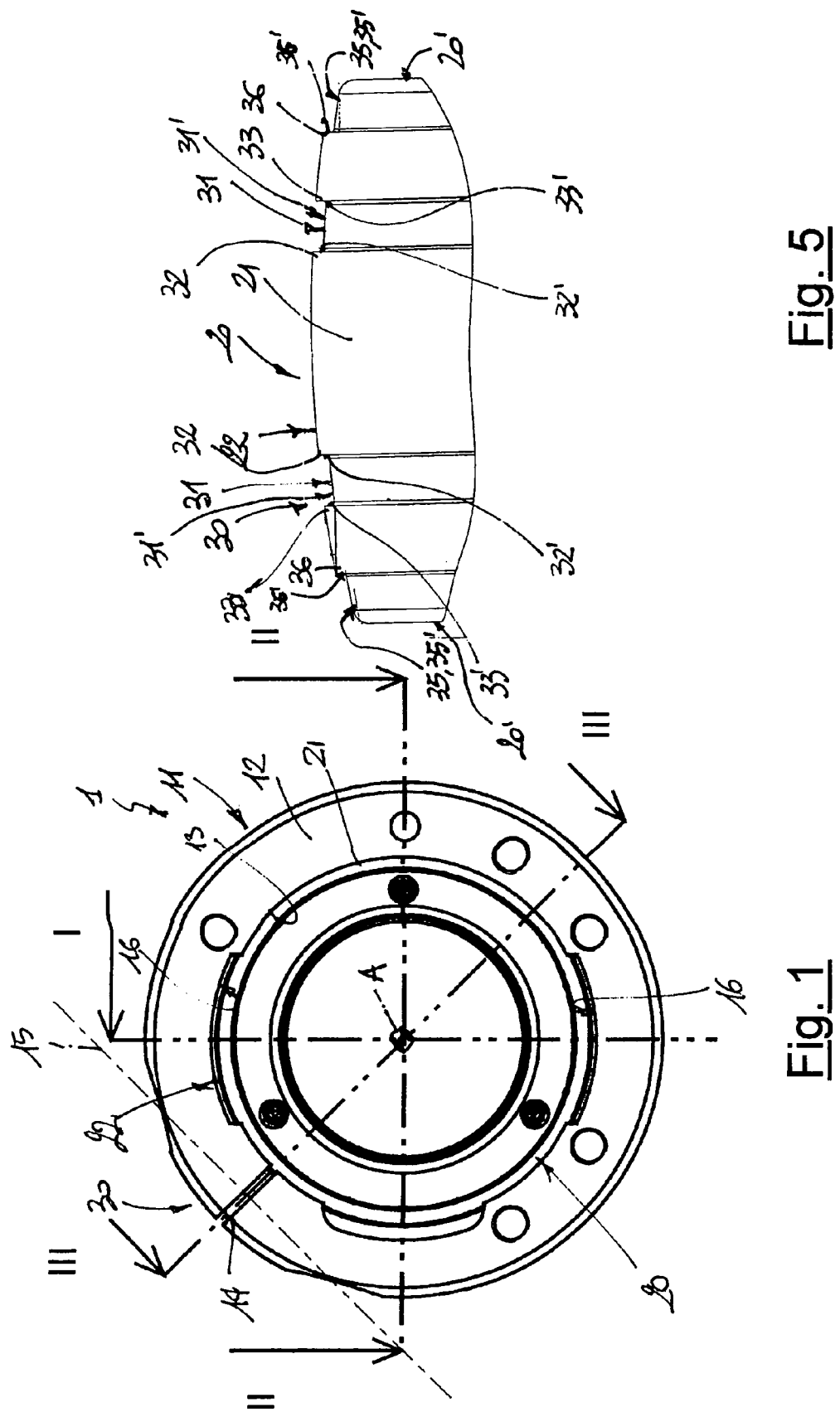

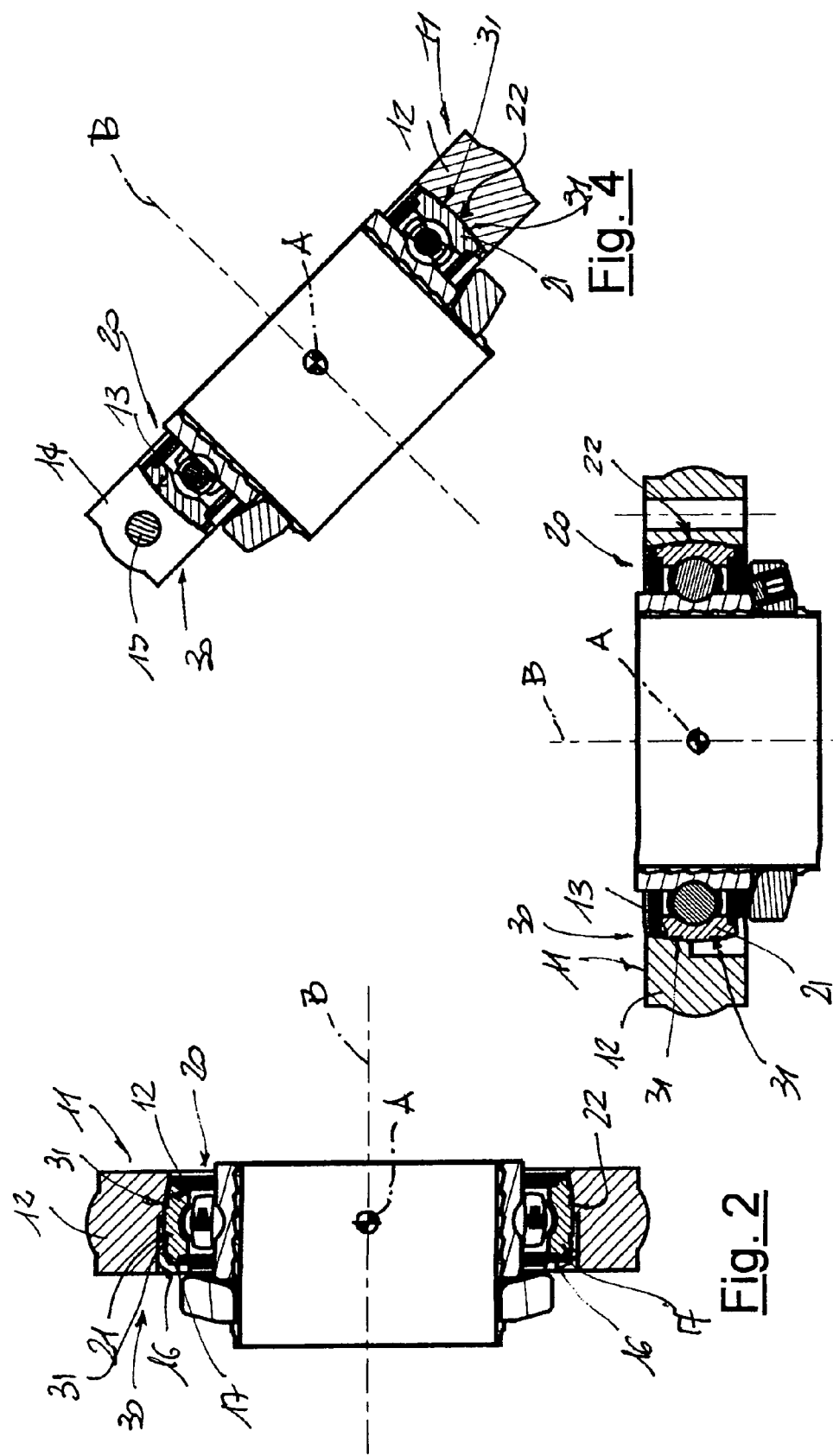

UNIT FOR SUPPORTING AXLE-SHAFT OF GO-KARTS

BACKGROUND OF THE INVENTION

The present invention relates to a unit for supporting the axle-shafts of go-karts.

In particular, the present invention regards a supporting unit referred to as "Y unit" and normally comprising:

- an adjustable support defined by an annular body provided with a concave seat having an axis of adjustment, and with a radial slit made in a plane transverse to the axis of adjustment itself;
- a ball bearing having an axis of rotation transverse to the axis of adjustment and comprising an outer ring, which is provided with a convex outer surface, and is mounted within the concave seat with the possibility of adjustment about the axis of adjustment; and
- a tightening element, which comprises a tangential screw set through the radial slit, and is designed to tighten the support on the bearing in order to block the bearing itself in an operative position.

Y units of the type described above are able to compensate for possible initial errors of alignment given that the bearings inserted in the supports can allow a moderate initial misalignment about the axis of adjustment, and are advantageously used for supporting the axle-shafts in go-karts, considering also the simplicity and economy of the systems that can be obtained with the Y unit itself.

In this application, once the bearing has been set in its own operative position, in which the axis of rotation of the bearing is aligned to the axis of rotation of the axle-shaft, the sharp and sudden stresses to which the axle-shafts themselves are subjected can cause, irrespective of the magnitude of the tightening force, the possible misalignment of the bearing within the support, without, however, any possibility of an automatic return of the bearing itself into its proper operative position.

Said misalignment reflects on the entire axle-shaft and on the capacity of the respective wheel to transmit the torque to the ground, i.e., in other words, said misalignment leads to a loss in performance of the go-kart, which can be remedied by resetting the bearing again in its operative position. Said latter operation can be carried out only with the go-kart stationary and, in any case, with also the risk of forcing the support too much on the bearing, with harmful consequences on the optimal operation of the entire Y unit.

In general, in the field of bearings, tightening elements are already known, which, in order to increase the capacity of gripping between the bearing and the corresponding support, have one or more recesses of various shapes made either on the outer surface of the outer ring of the bearing, or else on the inner surface of the concave seat to exploit the tendency of the metal material of the softer part, in general that of the support, to undergo deformation following upon tightening of the support on the bearing.

A significant example of embodiment of said recesses is known, for example, from the European patent application No. EP 1 347 189, which describes an improved seat for bearings that is able to increase tightening between the two parts, providing one of the two parts with surface irregularities and making the other part with a softer material.

In particular, in the European patent application No. EP 1 347 189 it is described how the outer surface of the outer ring of the bearing has a plurality of axial irregularities, which, during tightening, cut into the softer inner surface of the support, consequently increasing the grip between the bearing and the support, avoiding the need both to resort to very restricted tolerances and to resort to auxiliary accessories.

From the European patent application No. EP 1 347 189, it is evident that the axial irregularities, i.e., the ones made parallel to the axis of rotation of the bearing, have the primary function of increasing the interference in mounting of the bearing in the seat and of preventing a relative rotation of the outer ring and of the seat about the axis of rotation of the bearing itself.

However, in the case where the outer ring of a Y unit for axle-shafts of go-karts were provided with the same axial irregularities it would not be able in any case to counter effectively the above-mentioned stresses and consequently would not be able to prevent misalignment of the bearing from its own operative position

SUMMARY OF THE INVENTION

The purpose of the present invention is to provide a Y unit or unit for supporting the axle- shafts of go-karts, which, albeit maintaining the characteristics of ease of installation and low cost proper to the Y unit, will also enable the drawbacks described above to be solved in a simple and also economically advantageous way.

Provided according to the present invention is a unit for supporting the axle-shafts of go-karts comprising:

- an adjustable support defined by an annular body having a variable perimeter and provided with a concave seat inside the annular body and having an axis of adjustment;
- a rolling bearing having an axis of rotation transverse to the axis of adjustment and comprising an outer ring, which is delimited by a convex outer surface, and is mounted within the concave seat, with the possibility of adjustment about the axis of adjustment; and
- tightening means for tightening the support on the bearing by reducing said perimeter and blocking the bearing itself in an operative position,
- the supporting unit being characterized in that the tightening means comprise at least two sharp edges, which extend about said axis of rotation and on said outer surface and are made of a material having a hardness such as to cut into a softer material of the concave seat, preventing any rotation of the bearing about the axis of adjustment in said operative position, each sharp edge being provided with a respective undercut groove for enabling a cold plastic deformation of the material of the concave seat.

BRIEF DESCRIPTION OF THE SEVERAL VIEWS OF THE DRAWINGS

The invention will now be described with reference to the annexed plates of drawings, which illustrate a non-limiting example of embodiment thereof, in which:

FIG. 1 illustrates in side elevation a preferred embodiment of a unit for supporting axle-shafts of go-karts built according to the present invention;

FIGS. 2, 3 and 4 are cross sections of the unit illustrated in FIG. 1 according to the lines I-I, II-II and, respectively, III-III; and, FIG. 5 illustrates, at an enlarged scale with parts removed for reasons of clarity, a detail of FIG. 1.

DETAILED DESCRIPTION OF THE INVENTION

With reference to FIG. 1, the number 1 designates as a whole a unit for supporting the axle-shafts of go-karts .

The unit 1 comprises an adjustable support 11 made, for example, of magnesium alloys, or titanium alloys, or else of anodized aluminium, and is defined by an annular body 12, which has a variable perimeter and is provided with an internal concave seat 13 and has an axis A of adjustment.

In particular, the annular body 12 is designed to be fixed to the frame of a go-kart and has a radial slit 14, and a screw 15 set through the body 12 and astride of the slit 14 for reducing a gap of the slit 14 itself. The seat 13 is a cylindrical seat with a generatrix parallel to the axis A, and develops also about an axis B of rotation transverse to the axis A itself.

In addition, as will be illustrated more clearly in FIG. 2, the annular body 12 has two undercuts 16 made in positions diametrally opposite to one another and having a respective external radial profile 17 tangential to the bottom of the seat 13.

The unit 1 moreover comprises a rolling bearing 20, i.e., in the case in point, a ball bearing, which is set in an adjustable way about the axis A within the seat 13, and the axis of rotation of which corresponds to the axis B. The bearing 2 is made of steel for bearings or, in any case, of a material, the hardness of which is greater than the hardness of the material of the support 11, and comprises an outer ring 21, which is delimited by a convex outer surface 22, and is mounted within the concave seat 13 so that its own initial position of mounting can be adjusted about the axis A, i.e., so that, when the unit 1 is mounted on the respective axle-shaft, any possible misalignments between the axis B of the bearing 20 and the axis of rotation of the axle-shaft itself can be absorbed without any problem.

Finally, the unit 1 comprises a tightening system 30 for tightening the support 11 on the bearing 20 by reducing the perimeter support 11 itself and blocking the bearing 20 itself in an operative position, in which the axis B of the bearing 20 is aligned to the axis of rotation of the axle-shaft of the go-kart.

The system 30 comprises both the screw 15, rotation of which brings about reduction of the gap of the slit 14, and two grooves 31, which, as is illustrated more clearly in FIG. 5, are made through the surface 22 in positions symmetrical with respect to a plane of symmetry of the bearing 20 passing through the axis B and transverse to the axis A.

Each groove 31 extends in a continuous way about the axis B along the entire outer surface 22, and brings about the formation on the surface 22 itself of two sharp edges 32 and 33, of which the sharp edges 32 are axially more internal with respect to the sharp edges 33 and subtend an angle of amplitude greater than the sharp edges 33 themselves. The sharp edges 32 and 33 of each groove 31 are oriented specularly with respect to the sharp edges 32 and 33 of the other groove 31 and are delimited radially towards the outside from the surface 22, whilst they are delimited axially by respective surfaces 32' and 33' transverse to the axis A and radiused to respective bottom surfaces 31' of the corresponding grooves 31.

The surfaces 32' and 33' define with the corresponding surfaces 31' as many undercut grooves for the sharp edges 32 and 33, and the surfaces 32' are set axially facing the outside of the bearing 20 and determine with the surface 22 an opening substantially equal to 90° for the corresponding sharp edge 32, whilst the surfaces 33' are set axially facing the inside of the bearing 20 and determine with the surface 22 an opening smaller than 90° for the corresponding sharp edge 33.

As mentioned above, the support 11 is made of a material having a hardness lower than the hardness of the material of the outer ring 21 of the bearing 2, consequently, when the support 11 is tightened on the bearing 20 by acting on the screw 15, the sharp edges 32 and 33 are progressively driven into the seat 13, causing the material of the seat 13 to undergo plastic deformation thanks to contact pressures that are generated locally at the sharp edges 32 and 33 themselves, causing a cold flow of the material itself within the grooves 31, i.e., within the corresponding undercut grooves.

The effect of driving of the sharp edges 32 and 33 into the seat 13 and the partial filling of the grooves 31 renders the outer surface 22 of the bearing 20 absolutely fixed with respect to the concave seat 13, thus preventing, in view of the magnitude and the modalities of the deformations, any relative rotation of the bearing 20 with respect to the support 11.

To increase still further gripping between the support 11 and the bearing 20, the system 30 moreover comprises two further undercuts 35, which are made starting from the respective opposite lateral surface 20' of the bearing 20 itself, and each of which defines a respective further sharp edge 36 oriented on the same side as the corresponding sharp edge 32.

In particular, each undercut 35 extends axially within the surface 22 for an axial depth substantially equal to the width of the grooves 31 and has a radial depth that is also substantially equal to a radial depth of the grooves 31 themselves. In addition, each sharp edge 36 is radially delimited towards the outside by the surface 22, and is axially delimited by a respective surface 36' transverse to the axis A and radiused to a respective bottom surface 35' of the corresponding undercut 35, which is in turn radiused to a corresponding surface 20'. The surfaces 36' define with the corresponding surfaces 35' as many undercut grooves for each sharp edge 36, and determine with the surface 22 an opening of just higher than 90° for the corresponding sharp edge 36.

In use, once the bearing 20 has been inserted within the concave seat 13 using the two undercuts 16, it is possible to fit the unit 1 and the bearing 20 on the corresponding axle-shaft of the go-kart, without any immediate concern to align the axis A of the bearing 20 with the axis of rotation of the axle-shaft itself.

Once some operations of typical setting of the go-kart have been completed, it is possible for this purpose to tighten the support 11 on the bearing 20 using a torque wrench on the screw 15. As the tightening force increases, the softer material of the support 11, i.e., of the concave seat 13, will be progressively incised by the sharp edges 32, 33 and 36 thanks to contact pressures that are generated locally at the sharp edges 32, 33 and 36 themselves, causing, at the same time a flow of material into the grooves and into the undercuts 35, i.e., into the above-mentioned undercut grooves of the sharp edges 32, 33 and 36 themselves.

Said flow of material will determine a considerable increase in the resistance to rotation of the bearing 20 with respect to the support 11 until any possible rotation of the bearing 20 about the axis B, i.e., about the axis of adjustment, is prevented altogether.

In other words, up to complete tightening, the unit 1 described above behaves like any Y unit so far used for the axle-shafts of the bearings, whilst once tightening of the support 11 has occurred, the unit 1 will behave as if there were mounted within it an externally cylindrical bearing, i.e., in that it is able to perform any rotation about the axis B. Consequently, to the advantages of the Y unit of a known type consisting in its economy, in the practicality of installation and use, the tightening system 30 described above also adds the advantages of presenting a reliable and solid mounting typical of bearings with decidedly higher costs.

It is emphasized that the simultaneous presence of the sharp edges 32, 33 and 36 is not strictly necessary in order to block a relative rotation of the bearing about the axis A of adjustment in so far as, according to the technical requirements, even just the sharp edges 36 could be made, leaving the portion of surface 22 comprised between them intact. The axially external position of the sharp edges 36 and the presence of the undercuts 35, i.e., the possibility of the sharp edges 36 emerging free on the outside of the bearing 20 renders the action of the sharp edges 36 on the seat 13 more effective than the action of the sharp edges 32 and 33, rendering preferable, in some applications, provision of just the sharp edges 36 rather than the sharp edges 32 and 33 themselves. However, it has been noted that the presence also of just the sharp edges 32 and 33 enables in any case effective blocking of the bearing 20 in the seat 13.

Consequently, it is understood that the invention is not limited to the embodiment described and illustrated herein, which is to be considered purely as one example of embodiment of the unit for supporting the axle-shafts of go-karts, which may on the other hand undergo further modifications as regards the shape and arrangements of parts, details of construction and installation.

The invention claimed is:

1. A supporting unit for supporting axle-shafts of go-karts, the supporting unit comprising:
   an adjustable support comprising an annular body having a longitudinal axis extending therethrough and having an adjustable perimeter including a radial slit that extends longitudinally along a longitudinal extension of the annular body and defines a circumferential gap, the annular body having a cross-section parallel to the longitudinal axis that defines a concave seat disposed on an inner surface the annular body, and having an axis of adjustment transverse to the longitudinal axis and extending across the gap of the radial slit; and
   a rolling bearing having an axis of rotation transverse to the axis of adjustment and coplanar with respect to the longitudinal axis, the bearing comprising an outer ring having a cross-section parallel to the longitudinal axis that defines a convex outer surface, the rolling bearing being concentrically mounted within the concave seat so as to be adjustable about the axis of adjustment and such that the relative angle between the axis of rotation and the longitudinal axis of the support is adjustable; and
   tightening means for tightening the support on the bearing by reducing said perimeter and the gap of the radial slit and locking the bearing in an operative position, the outer ring including at least one sharp edge formed on the convex outer surface and annularly extending about said axis of rotation, the ring having a hardness such that each sharp edge is configured to cut into a softer material of the concave seat so as to prevent any rotation of the bearing about the axis of adjustment in said operative position, the ring further having an annular undercut groove adjacent to each sharp edge for enabling a cold plastic deformation of the material of the concave seat into the groove to fix the outer ring in said operative position.

2. The supporting unit according to claim 1, wherein the outer ring includes at least two said sharp edges formed on the ring so as to be symmetrical with respect to a plane of symmetry of the bearing passing through said axis of adjustment.

3. The supporting unit according to claim 1, wherein said outer ring includes a further said sharp edge formed so as to face the at least one sharp edge, the further sharp edge acting on said concave seat in a direction opposite to the at least one sharp edge.

4. The supporting unit according to claim 3, wherein the further sharp edge is provided with a respective further said undercut groove for enabling a cold plastic deformation of the material of the concave seat.

5. The supporting unit according to claim 4, wherein said undercut groove and said corresponding further said undercut groove are each formed by an annular groove of a given depth made starting from the outer surface of said outer ring.

6. The supporting unit according to claim 1, wherein said outer ring further includes at least one further undercut made on said outer surface in an axially external position and about said axis of adjustment, and at least one further sharp edge defined by the further undercut, the further sharp edge being configured to deform the softer material of said concave seat.

7. The supporting unit according to claim 1, wherein the outer ring comprises a screw set in a direction transverse to the radial slit and configured to tighten the support on the bearing by reducing the gap of the radial slit.

8. The supporting unit according to claim 6, wherein the tightening means is a screw, set in a direction transverse to the radial slit for tightening the support on the bearing by reducing the gap of the radial slit.

* * * * *